United States Patent [19]
Pina et al.

[11] 4,421,817
[45] Dec. 20, 1983

[54] METHOD FOR MAKING PRINTABLE SELF-ADHESIVE TAPES AND THE SELF-ADHESIVE TAPES OBTANED THEREBY

[76] Inventors: Felice Pina, Via Poliziano, 12, Milano; Graziano Galli, Via Vitruvio, 31, Formia (Latina), both of Italy

[21] Appl. No.: 342,598

[22] Filed: Jan. 25, 1982

[51] Int. Cl.³ .................... B32B 3/00; B05D 1/00; C09J 7/02
[52] U.S. Cl. .................... 428/207; 427/209; 428/341; 428/343; 428/352; 428/424.8; 428/476.9; 428/520; 428/913; 428/914
[58] Field of Search ............. 428/352, 341, 343, 207, 428/520, 914, 424.8, 476.9, 913; 427/209

[56] References Cited
U.S. PATENT DOCUMENTS
4,343,856 8/1982 Goswami et al. ............ 428/352 X Primary Examiner—Thomas J. Herbert, Jr.
Attorney, Agent, or Firm—Bucknam and Archer

[57] ABSTRACT

A method for making self-adhesive printable tapes is described, provided with a supporting member made of an olefin polymer or copolymer, in particular polypropylene, wherein the antiadhesive surface of the supporting member or film, provided for receiving the printed marks, is coated by a lacquer including polymers or resins having a good adhesion to the supporting film, good antiadhesive properties and a very good receptivity with respect to the inks used in printing.

Examples of such polymers and resins are: copolymers of acrylic or methacrylic esters with alcohols, polyurethane resins, lacquers including modified cellulose ethers and esters, polyamide copolymers and cellulose ester modified polyamide copolymers.

7 Claims, No Drawings

METHOD FOR MAKING PRINTABLE SELF-ADHESIVE TAPES AND THE SELF-ADHESIVE TAPES OBTANED THEREBY

BACKGROUND OF THE INVENTION

The present invention relates to a method for making printable self-adhesive tapes, provided with a supporting member or film consisting of olefin polymers or copolymers, in particular polypropylene.

It is known that, a film of polypropylene or any other olefin polymer or copolymer is not receptive with respect to the printing inks and, accordingly, it cannot be printed.

It is also known that, in order to render the printing possible, it is necessary to surface process the film by electric charges, or by flame processing, in such a way as to modify the surface of the film, so as to provide the chemical-physical conditions suitable for receiving and holding inks.

This processing is carried out to increase the film surface tension up to 40 dynes/cm (on the not processed film it is of 30 dynes/cm), so as to provide a more wettable film with respect to the printing inks.

In fact, by means of the aforesaid processes, there is increased the contact angle between the film (which is solid) and the inks (which are liquid), in such a way as to facilitate the adhesion of the inks, according to the first adhesion law.

The practical measurement of the surface tension is carried out by means of known surface tension liquids, according to the methods of TAPPI and ASTM.

There are known in the trade printing inks suitable for printing processed polypropylene, which printing inks are conventionally used for printing materials for packaging applications and the like.

In the case of self-adhesive tapes provided with a polypropylene or other olefin polymer supporting film or member, as provided for printing applications, it is necessary to process the film on a surface, in such a way as to allow the film to receive the adhesive layer (either with or without an intermediate anchoring layer), and on the other surface, to receive the printed marks.

On the other hand, this two-step processing may cause the so-called blocking phenomena to occur, due to the strong adhesion of the self-adhesive layer on the back, with consequent breakage during the unwinding of the rolls.

In order to eliminate the abovementioned drawback, one may think to apply on the adhesive free surface an antiadhesive layer, the so-called "release coat." This antiadhesive layer, however, presents the drawback of being repulsive with respect to the printing inks.

In some cases it is possible to solve this problem by applying a lacquer on the back of the tape or by using, for making said tape, a mono- or bi-lacquer supporting member or film.

These lacquered supporting members are commercially available and used, mainly, in order to render the tape material thermosealable, in addition to being printable. However, apart the cost, the application of these lacquers (which generally are based on acrylic and vinyl copolymers) in making printable autoadhesive tapes, requires the use of a primer. Thus, the application of the lacquer has to be carried out by two steps.

This two step method, on the other hand, is different from the presently used method for making self-adhesive tapes provided with a polyethylene supporting member, in which all of the operations are carried out by a single step.

In fact, it is well-known that, the presently used method for making self-adhesive tapes provided with a processed polypropylene supporting member or film consists of applying, on a face of the film, an anchoring layer and an adhesive layer and, on the other face of the film, an antiadhesive layer.

More specifically, the anchoring layer, which, in some cases may also be omitted, generally consists of a solution or dispersion of elastomeric and/or plastics materials.

The adhesive layer, on the other hand, consists of a solution of elastomeric materials, modified by tackifying resins, in organic solvents, or of aqueous dispersions of elastomeric and/or plastics materials.

Alternatively, the layer may consist of adhesive materials based on block elastomeric copolymers, plastics materials (acrylic, polyesters, and so on), or of solvent free adhesives, based on acrylic prepolymers, polyurethane prepolymers, and so on which may be crosslinked by chemical methods or by radiation, such as U.V and E.B radiation.

The materials used to provide the antiadhesive layer consist of vinyl esters, long chain higher alcohols, including preferably from 14 to 22 carbon atoms, or polyvinyl carbamates, also of the long chain type.

These compounds, however as discussed hereinabove, are repulsive with respect to the printing inks, so that the obtained self-adhesive tapes can not be printed.

SUMMARY OF THE INVENTION

Accordingly, an object of the present invention is to provide a self-adhesive tape, including a supporting member or film consisting of an olefin polymer or copolymer, in particular polypropylene, which is provided with an antiadhesive or release coat layer consisting of a lacquer effective to be printed by using conventional printing inks.

According to one aspect of the present invention, this and other objects are achieved by applying on the face of the processed supporting member or film opposite to the face provided with the adhesive layer, a layer of a lacquer based on polymers or resins having a good adhesion to the processed olefin polymer or copolymer film, and good antiadhesive or releasing properties, in such a way as not to deleteriously affect the tape unwinding characteristics, and a very good receptivity with respect to the printing inks.

There are known several polymers and resins having the above mentioned properties and which, accordingly, may be advantageously used for forming the antiadhesive layer on the self-adhesive printable tapes; among these compounds the following are listed: the acrylic or methacrylic ester copolymers obtained from acrylic and/or methacrylic acid and alcohols, the polyurethane resins obtained by condensation of polyenes and isocyanates, the lacquers based on modified cellulose ethers and esters, the polyamide copolymers and the cellulose ester modified polyamide copolymers, and so on.

The following are indicative though not limitative examples of these polymers or resins:

(1) Acrylic or methacrylic resins, obtained by polymerizing or copolymerizing the following compounds:
methyl methacrylate
ethyl methacrylate butyl methacrylate
methyl acrylate
ethyl acrylate
butyl acrylates
which are commercially available under the designations of "ELVACITE" (Du Pont de Nemours), "PARALOID" or "ACRYLOID" (Roehm & Haas), "DEGAN LP" (Degussa Geschäftsbereich Chemie), modified by alkyd, cellulose, epoxy, phenoxy resins. These modified resins are dissolved in organic solvents such as methylethylketone, ethyl acetate, toluene, butyl alcohol, and so on, with a dry contents of about 20%.

(2) Polyurethane resins, obtained by condensation of polyenes and isocyanates, as commercially available under the designations of "LIOFOL UK" (Henkel), "PENTACOLL" (Wikolin Polymer).

(3) Polyamide copolymers, commercially available under the designations of "VERSAMID" (Shering) and "REAMMIDE" (Chem Plast), modified by plastifiers such as sulfonamides and cellulose resins, such as nitrocellulose.

Typical formulations of the lacquers used, given by way of not limitative examples, for preparing the antiadhesive printable layer are the following:

| FORMULATION A | |
|---|---|
| Paraloid A 11 (Rohm & Haas, Philadelphia) | 80 ppm's |
| Vinylite VMCH, a chloroacetovinyl copolymer (U.C.C.C., New York) | 20 ppm's |
| Epoxy resin 828 (Shell Chimica, Milan) | 5 ppm's |
| Methylethylketone | 200 ppm's |
| Ethyl acetate | 200 ppm's |
| Toluene | 150 ppm's |
| Isopropyl alcohol | 50 ppm's |
| TS = 15% | |
| FORMULATION B | |
| Pentacol PR 19/24 (Wikolin Polymer Chemie, Bremen) | 100 ppm's |
| Hardener MK 40/32 (Wikolin Polymer Chemie, Bremen) | 6 ppm's |
| Diluent, a mixture of methylethylketone and toluene | 70 ppm's |
| TS = 15% | |
| FORMULATION C | |
| Versamid 961 (Shering, Milan) | 100 ppm's |
| Nitrocellulose ½ sec (Hercules, Milan) | 10 ppm's |
| Isopropyl alcohol | 300 ppm's |
| Ethyl acetate | 300 ppm's |
| TS = 15.5% | |

For preparing self-adhesive tapes provided with a printable olefin polymer or copolymer supporting member or film, the expanded mono- or bi-oriented film, processed on a portion of the film in such a way as to present a surface tension of about 40 dynes/cm, is brought onto a three head coating machine, for applying the so-called "release coat" (thereinafter called RC), an anchoring layer and a self-adhesive layer, according to the known methods.

The film side provided for receiving the RC, in particular, is processed by means of the corona effect, in such a way as to present a surface tension included between 36 and 40 dynes/cm.

According to the method of this invention, instead of the RC there is applied a layer of a lacquer having one of the formulations A shown hereinabove B or C, by the Gravure or Mayer Bar system or any other suitable systems.

The dry end lacquer on the film is included in an amount of 0.5 to 1.5 g/m².

Then the lacquer layer is dried in an oven, in such a way as to cause the solvents to evaporate.

On the film opposite side or face there is applied the anchoring layer if necessary and the adhesive layer, of known composition and by known methods.

Upon drying the primer and adhesive layer, the adhesive film is wound in rolls provided for being transformed into tapes having the desired width and length.

For the thus obtained lacquer tapes there are determined the tackifying characteristics on steel and on supporting members, the unwinding force, the so-called "tack" and lacquer transfer, according to AFERA and PSTC.

With the above formulations A, B and C, were obtained the following values:

| SAMPLES | A | B | C |
|---|---|---|---|
| Adhesion on steel, in g/cm | 220 | 236 | 200 |
| Adhesion on supports, in g/cm | 160 | 200 | 155 |
| Unwinding force, in g/cm | 290 | 320 | 220 |
| Rolling ball, in tack cm | 2 | 2 | 1.5 |
| Lacquer transfer (upon accelerated ageing at 0° C. for 72 h) | slight | none | none |

The thus obtained lacquered rolls are printed by using suitable printing inks which are well known to those skilled in the art.

There are generally used printing inks based on polyamide resins, commercially available, effective to adhere to the lacquered surface.

The used printing machine can be of the flexographic, rotogravure or screening type, suitably modified in order to assure a complete and perfect drying of the ink and to permit the application, either simultaneous or successive, of an additional antiadhesive layer.

The antiadhesive layer is such as to permit an easy unwinding of the tape and prevent backprinting, without deleteriously affecting the adhesive characteristics due to migration and/or transfer phenomena.

The application of the abovementioned antiadhesive layer is carried out by solutions in organic solvents of adhesive compounds, by means of the Mayer Bar, Rotogravure, Kiss-Roll systems, or combinations of these latter.

The most suitable antiadhesive compounds are: long chain fat alcohol vinyl esters, containing from 16 to 24 carbon atoms; polyvinylcarbamates; or hemiesters or hemiamides of long chain aliphatic compounds, including from 16 to 30 carbon atoms, effective to provide a good anchoring to the lacquered and inked surface.

The antiadhesive compounds are either dissolved or dispersed in volatile organic solvents, such as aromatic and aliphatic hydrocarbons, esters, ketones, alcohols and so on or in aqueous dispersions with a solid contents from 0.2 to 5%, the dispersing phase being completely removed by means of evaporation.

Upon evaporation of the solvents or dispersing phase, the antiadhesive layer remaining on the lacquered and inked surface facilitates the unwinding of the tape, without causing backprinting phenomena and without altering the characteristics of the applied adhesive.

The sequence of the carried out printing operations carried out on the self-adhesive tape provided with the lacquered supporting film was the following:
  unwinding of the tape
  flexographic printing in one or more colours, by means of suitable inks;

drying of the inks
application of an antiadhesive layer
drying
cooling of the tape
winding of the finished printed tape The characteristics of the printed tapes, obtained by using the above formulations A, B and C are the following:

| SAMPLES | A | B | C |
| --- | --- | --- | --- |
| Adhesion on steel, in g/cm | 225 | 250 | 200 |
| Adhesion on supports, in g/cm | 160 | 180 | 155 |
| Unwinding force, in g/cm | 260 | 280 | 210 |
| Rolling ball, in tack cm | 2.5 | 3 | 2 |
| Initial backprinting | light | slight | none |
| Backprinting upon accelerated ageing at 60° C., 72 h | " | " | slight |

The measurements have been carried out according to the AFERA and PSTC Standards.

For "backprinting" it is meant the removing of the printing or the lacquer by the adhesive.

From the above description and the examination of the aforesaid characteristics of the printed tapes, the advantages and technical progress characterizing the method for making and printing self-adhesive tapes provided with an olefin polymer or copolymer supporting film according to the present invention, are evident.

We claim:

1. A self-adhesive printed tape consisting of a film of polypropylene, an adhesive layer applied to one surface of said film and an antiadhesive lacquer applied on the other surface of said film, said antiadhesive layer being in the amount of 0.5–1.5 g/m² of said tape and being one member selected from the group consisting of acrylic and methacrylic resins, polyurethane resins, polyamide copolymers, and being printed on.

2. A method of manufacturing a printable self-adhesive tape which consists of
   (1) processing a film of polypropylene to increase the surface tension thereof to a value of 40 degrees/cm;
   (2) applying to a surface of the film from step (1), an adhesive layer;
   (3) applying to the opposite surface, an antiadhesive lacquer receptive to printing inks, said antiadhesive layer being a solution of a member selected from the group consisting of acrylic, methacrylic resins, polyurethane resins obtained by condensation of polyenes and isocyanates, polyamide copolymers, and modified cellulose ethers and esters in an organic solvent and evaporating the solvent.

3. The method according to claim 2 wherein said lacquer in step (3) is applied in an amount between 0.5 and 1.5 g/m² of said tape.

4. The method according to claim 2 wherein said organic solvent is methylethylketone, ethyl acetate, toluene, isopropyl alcohol or butyl alcohol.

5. The method according to claim 2 wherein said antiadhesive layer consists of 5 parts of epoxy resin, 20 parts of a chloroacetovinyl copolymer and 80 parts of an acrylic resin.

6. The method according to claim 2 wherein said antiadhesive layer consists of 100 parts of a polyurethane resin.

7. The method according to claim 2 wherein said antiadhesive layer consists of 100 parts of a polyamide copolymer modified by nitrocellulose.

* * * * *

UNITED STATES PATENT AND TRADEMARK OFFICE
CERTIFICATE OF CORRECTION

PATENT NO. : 4,421,817
DATED : DECEMBER 20, 1983
INVENTOR(S) : FELICE PINA et al

It is certified that error appears in the above-identified patent and that said Letters Patent are hereby corrected as shown below:

In column 6, line 7, "40 degrees/cm" should read

-40 dynes/cm-.

Signed and Sealed this

Fifteenth Day of October 1985

[SEAL]

Attest:

DONALD J. QUIGG

Attesting Officer

Commissioner of Patents and
Trademarks—Designate